3,072,661
NEW PROCESS FOR IMPROVED BIS-IMIDAZOLE VAT DYESTUFF PIGMENTS

Roy A. Pizzarello, Mount Vernon, N.Y., and John J. De Lucia, New Milford, and Philip L. Maguire, Totowa Boro, N.J., assignors to Interchemical Corporation, New York, N.Y., a corporation of Ohio
No Drawing. Filed Aug. 24, 1960, Ser. No. 51,502
2 Claims. (Cl. 260—282)

This invention relates to a new process for making improved bis-imidazole vat dyestuff pigments. More particularly it relates to the improvement of Indanthrene Bordeaux RR.

In the preparation of bis-imidazole vat dyestuffs made from 1,4,5,8-naphthalene tetracarboxylic acid and an aromatic ortho diamine, which may or may not have other substituents in the ring, there is formed a mixture of approximately equal amounts of cis- and trans-isomers. Generally speaking the mixtures are not bright in color but the separated isomers are. By proper treatment some vat dyestuffs can be converted into very attractive and valuable pigments. We have found this to be particularly true of the bis-imidazole vat colorants mentioned before.

In one of the known methods of isomer separation, the insoluble potassium salt of the trans-isomer is formed and it can be readily hydrolyzed in water to produce a vat dyestuff. At this stage of the process valuable pigments can be obtained through the procedures of pigment technology. If correct control is not exercised in the formation of the pigments, much difficulty will be incurred. The pigments will not formulate properly in various applications, as evidence by thixotropy and the attendant undesirable behavior.

The condensation product of one mole of 1,4,5,8-naphthalene tetracarboxylic acid and two moles of orthophenylenediamine is Indanthrene Scarlet GG, a cis-trans-mixture of approximately equal parts of two isomers, Indanthrene Brilliant Orange GR (trans) and Indanthrene Bordeaux (cis). The separation and treatment of the trans-isomer has already been described in our copending application, Serial No. 51,503, filed August 24, 1960. In the process described therein 41.2 g. Indanthrene Scarlet GG, was treated with a solution of 412 g. 190-proof ethyl alcohol, 24.7 g. water and 82.4 g. of potassium hydroxide by heating to reflux temperature for one hour. After cooling to 20° C. the crystalline mass, mostly trans-isomer, was filtered off and again refluxed in a solution of 77.2 g. 190-proof ethyl alcohol, 31.9 g. water, and 21 g. potassium hydroxide for one hour, cooled to 20° C., filtered and washed portion-wise with a solution of 106 g. 190-proof ethyl alcohol, 44.4 g. water, and 26.2 g. potassium hydroxide. The combined filtrates contained the cis-isomer.

The filtrate can be processed by known methods. The prior art isolated the cis-isomer by running the combined filtrates into concentrated hydrochloric acid at 80° C. This produced a pigment neither clean nor bright and which lacked tinctorial strength. When it was formulated in alkyd automotive enamels the enamels became thixotropic and gelled.

We have now found a process for isolating the cis-isomer that eliminates all of the undesirable pigment characteristics just mentioned. The alcoholic caustic potash filtrate obtained in the separation of isomers described above in 200 g. of Indanthrene Scarlet GG will have a volume of approximately four liters in the method outline above.

Example 1

Four liters of this alcoholic caustic filtrate were distilled until 2.8 liters of alcohol had been recovered, the residue was cooled to 40° C., and 2.8 liters of water added slowly over a period of 15 minutes stirring constantly and keeping the temperature at 40° C. The watered material was clarified by adding 8.0 g. of Nuchar C 115 (activated charcoal), 8.0 g. of Hyflo Super Cel (diatomaceous earth), and was filtered at 40° C. Over a period of 15 to 30 minutes, 1720 g. of a 50% aqueous solution of para-toluene sulfonic acid solution were added, allowing the temperature to rise to 55° C. Stirring was continued for 30 minutes at 55° C. and an additional 30 minutes at 90° C. The pH of the pigment slurry was usually 11.0 to 12.5. After being filtered hot the pigment was washed free of salt and alkali. When dried and pulverized, this improved Indanthrene Bordeaux was found to be cleaner, brighter, and stronger tinctorially than any known commercial product of this type. Some of the steps in this new process are critical, others are not. In the first treatment applied to the alcoholic alkaline solution containing the cis-isomer the alcohol is mostly distilled off for two reasons; to recover the alcohol and to permit its replacement with about an equal quantity of water so that the later heating to 90° C. will be feasible, and also to avoid undesirable dilution. We prefer to distill off 2.8 liters from the starting batch of 4 liters, which has an alcoholic strength of about 75–80%. 3.0 liters may be distilled off if for any reason this seems expedient, such as possible difficulty in measuring 2.8 liters exactly. Distilling more than 3.0 liters is inadvisable, primarily because the pigment may precipitate, but also because the recovered alcohol would have a higher water content. Even if recovery of the alcohol is not wanted, addition of water would still be necessary to attain the 90° C. temperature desired in a later step. We prefer to have the recovered alcohol at a strength of 95%. A simple still is adequate. Before adding water, it is necessary to cool the solution, which is fairly concentrated alkali after the distillation, else the temperature would rise too high on addition of water. For reasons of economy and convenience we lower the temperature at 40° C. and that is quite adequate, although the process, chemically speaking, would be equally good if the cooling was carried to any point below this down to about 10° C. The next step is preferably the addition of 2.8 liters of water over a period of 15 minutes, keeping the temperature around 40° C. or lower. Slower addition is equally effective but unnecessarily time consuming. A 2.8-liter addition is preferred but some leeway is permissible. If too much water is added the pigment will start to precipitate. On the other hand enough water must be added to dilute the excessively strong alkali and also to obtain a workable volume of material, to help dissolve water-soluble impurities, and to make possible the later heating to 90° C. We have found Nuchar C 115 (activated charcoal) to be satisfactory, but any other adsorbent designed for such work in aqueous alkali may be used, such as suitable types of fuller's earth or other activated charcoals. The quantities to use are more or less obvious to those skilled in the art as also are the quantities and types of filter aids. We have found Hyflo Super Cel (a brand of diatomaceous earth) to be quite satisfactory. After the solution has been substantially cleaned up by these preliminary treatments, the pigment is precipitated in the form of a suitably fine dispersion by the addition of para-toluene sulfonic acid, which accomplishes both these aims. It is not only convenient and economical to use a combined precipitant and dispersing agent but, more important, para-toluene sulfonic acid gave us a better pigment than did many combinations of dispersing agents with other acids. We prefer to add the acid over a period of 15 to 30 minutes at working temperatures of 55° C. or less, however, the time and temperature are not particularly critical, those preferred being selected on the basis of economy and convenience. The best ratio of acid to pigment was found to be that used in the example. Up to 25% more acid might be used, but the product would be somewhat less clean although the yield would be somewhat higher. Down to 25% less acid might be used, but less pigment would be obtained. In the latter case it is a question of balancing the economics of the situation. The step of heating to 75–95° C. is important to destroy the pigment's thixotropic properties. We have found the pigment to have optimum characteristics when the heating is conducted at about 90° C. for about 30 minutes. Heating for longer periods adds nothing except when lower temperatures are used, however at temperatures lower than about 75° C. the pigment retains its undesirable thixotropic properties even with prolonged heating. Heating above 90° C. is unnecessary and heating above 95° C. is also uneconomical.

What is claimed is:

1. A process wherein the water-soluble potassium salt of the cis-isomer product of the condensation of one mole of 1,4,5,8-naphthalene tetracarboxylic acid with two moles of orthophenylenediamine, after being freed from the accompanying trans-isomer product in alcoholic alkaline solution is treated by (1) decreasing the alcoholic content of said alcoholic alkaline solution to about 20% by weight by distillation (2), the volume of the 20% solution being made approximately equal to the original volume of the alcoholic alkaline solution so treated by replacing the alcohol with an approximately equal volume of water, (3) clarifying the solution with a suitable adsorbent, (4) removing the adsorbent and the other solid material present, (5) adding para-toluene sulfonic acid in an amount ranging from about 6 to 12 times the weight of the cis-isomer present, (6) heating to around 55° C. for about 30 minutes, (7) heating to a temperature of from 75° C. to about 90° C. for at least 30 minutes, and (8) separating the resulting pigment from the reaction mixture.

2. A process wherein the water-soluble potassium salt of the cis-isomer product of the condensation of one mole of 1,4,5,8 naphthalene tetracarboxylic acid with two moles of orthophenylenediamine, after being freed from the accompanying trans-isomer product in alcoholic alkaline solution is treated by (1) distilling off from about 65% to about 75% of approximately 190-proof ethyl alcohol, (2) replacing the alcohol with an approximately equal amount of water while maintaining the temperature at from about 10° C. to about 50° C., (3) clarifying the solution with a substantial amount of a suitable activated charcoal, (4) filtering, (5) adding para-toluene sulfonic acid in an amount ranging from 6½ to 11 times the weight of the cis-isomer, (6) heating at about 55° C. for about 30 minutes, (7) heating at 75° C. to about 90° C. for an additional period of at least 30 minutes, and (8) separating the pigment from the reaction mixture.

References Cited in the file of this patent
UNITED STATES PATENTS

| | | |
|---|---|---|
| 1,927,928 | Eckert et al. | Sept. 26, 1933 |
| 1,952,661 | Eckert et al. | Mar. 27, 1934 |